Dec. 10, 1957  J. F. TALAK  2,815,703
HYDRAULIC POWER LIFT AND CONTROL DEVICE
Filed May 29, 1950  5 Sheets-Sheet 1

Inventor
JOHN F TALAK
By
Emerson B Donnell
Attorney

Dec. 10, 1957 J. F. TALAK 2,815,703
HYDRAULIC POWER LIFT AND CONTROL DEVICE
Filed May 29, 1950 5 Sheets-Sheet 4

Inventor
JOHN F TALAK
By Emerson B Donnell
Attorney

United States Patent Office 2,815,703
Patented Dec. 10, 1957

2,815,703

HYDRAULIC POWER LIFT AND CONTROL DEVICE

John F. Talak, Silvis, Ill., assignor to J. I. Case Company, Racine, Wis., a corporation of Wisconsin Application May 29, 1950, Serial No. 165,077

4 Claims. (Cl. 97—46.59)

The present invention relates to tractors and more particularly to power lift devices therefor and an object of the invention is to generally improve the construction and operation of devices of this class. A further object is to provide such devices in which the power lifting function is available whenever the tractor engine is running, regardless of the condition of the tractor transmission. Further objects are to provide such a power lift in which the lifting function is independent of the tractor main clutch; in which the active part of the lifting mechanism is located at a convenient position on the tractor to be out of the way when not needed; in which, when motion is initiated, it will continue such motion to a predetermined point and then automatically cease moving; and which power lift may be conditioned to automatically maintain a predetermined depth of an implement controlled by the power lift.

Further objects are to provide such a power lift in which slight unavoidable leakage of the operating fluid will have no detrimental effect; in which such leakage is readily for the most part avoided; which operates at a comparatively low pressure and with a substantial volume of fluid; and in which storage space is readily provided for sufficient fluid to serve the purposes of the mechanism.

Further objects and advantages will become apparent from the following specification and accompanying drawings in which Fig. 1 is a side elevation of a tractor with a power lift attached embodying the invention, parts of the tractor and power lift being broken away to illustrate interior features.

Figure 1ª is an enlarged detail with parts broken away, of certain mechanism indicated in Fig. 1.

Figures 1, 1A:
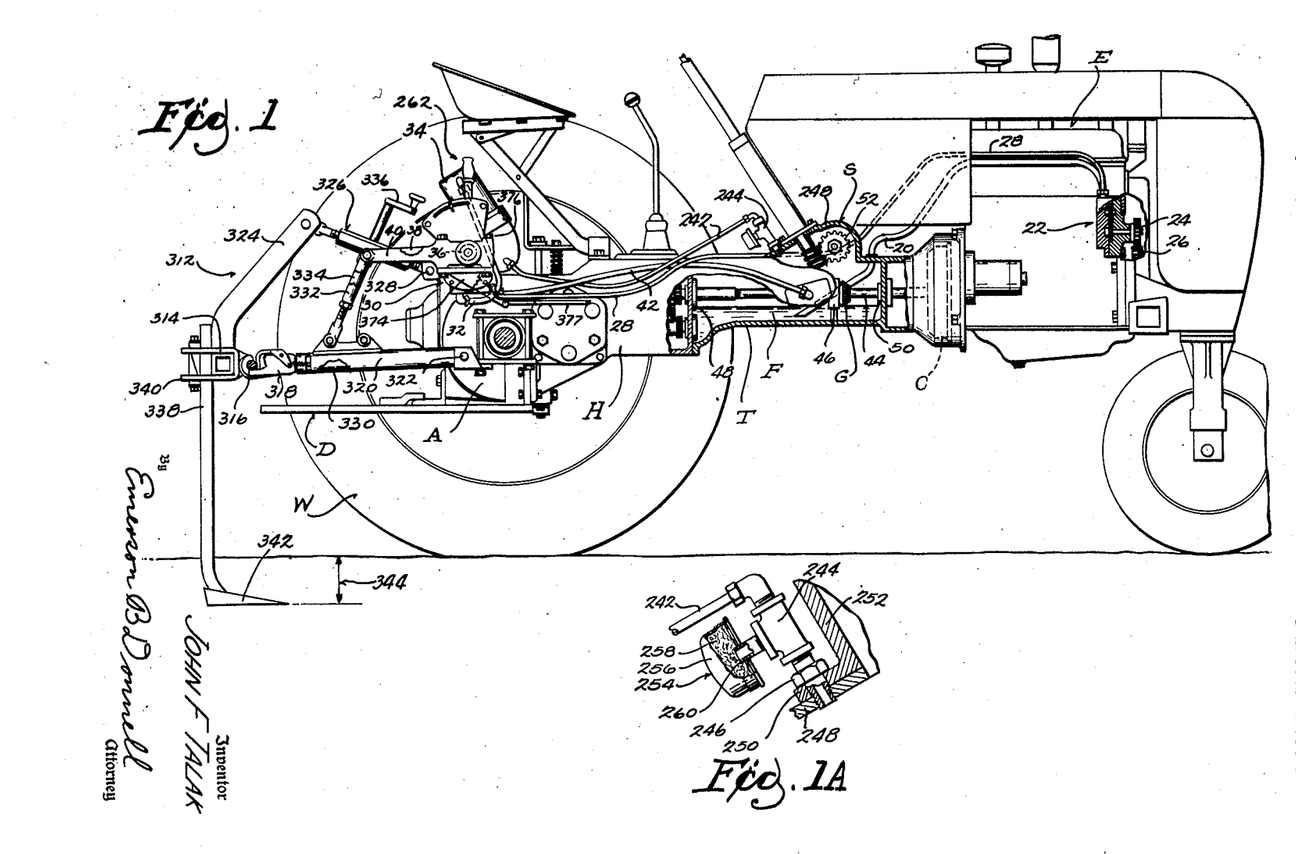

As seen in Fig. 1, the tractor includes an engine E, a clutch C, belt pulley driving gear G enclosed in a housing or torque tube T, a transmission housing H, a rear axle housing A, a drawbar D, a traction wheel W, and a steering gear S, it being understood that numerous other parts such as front wheels, seat, radiator, gear shift, etc., being common and well-known parts of tractors are included, but not further described since they form no part of the present invention. Torque tube T serves a dual purpose, first as the main structural member between the front and the rear of the tractor, connecting as it does engine E and transmission housing H. It also has a generous interior space and serves as a reservoir for the hydraulic fluid F. When lifting is in progress fluid F is drawn through a suction pipe 20 into a pump generally designated as 22 which is driven, through a gear 24 directly from the timing gear 26, already present for well-known purposes in engine E. Thus pump 22 is driven at all times when engine E is in operation. Fluid from pump 22 is forced to the rear of the tractor through a pressure pipe 28 to a valve mechanism or fluid control unit generally designated as 30 from which it is directed through a pipe 32 to ram cylinder 34. As will be fully described presently, this fluid, through action in cylinder 34 causes rocking of a rockshaft 36 on which are fastened arms 38 and 40 from which appropriate connections extend to the implements to be lifted as will appear. When the lifting action has been accomplished, fluid control unit 30 is actuated so as to prevent further flow of fluid into ram cylinder 34, the flow from pump 22 through pipe 28 then being returned through a pipe 42 to torque tube T, the fluid being continually bypassed in this manner without developing any substantial pressure and without consuming any material amount of power.

Returning to a more detailed description of the device, torque tube T accommodates a drive shaft 44 which carries above-mentioned belt pulley driving gear G and is supported in a bearing 46 fixed in relation to torque tube T. Shaft 44 passes through suitable bearings and oil seals 48 and 50 so that the space about shaft 44 is available as a fluid reservoir, leakage into transmission housing H or the space occupied by clutch C being thereby prevented. Fluid F is preferably lubricating oil of a grade similar to that used in engine E and suitable for lubrication of bearings 46, 48 and 50 as well as gear G. Incidentally the rapid rotation of gear G when immersed or partially immersed in fluid F tends to throw a certain amount of the fluid onto a worm wheel 52 forming part of above-mentioned steering gear S. In this way the several parts associated with torque tube T are adequately lubricated at all times.

Figure 2:
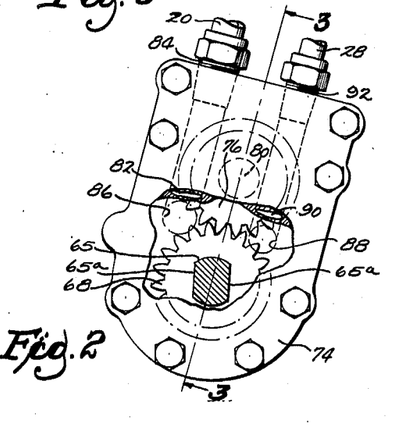
Fig. 2 is an enlarged rear elevation with parts broken away of a pump indicated in Fig. 1.
Figure 3:
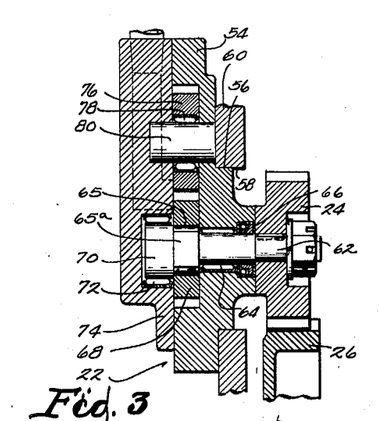
Fig. 3 is a sectional view of the same taken substantially on the line 3—3 of Fig. 2.

Pump 22 comprises a body portion 54, Fig. 3, having a piloting shoulder 56 engaged in a bore 58 in a flange 60 forming a part of above-mentioned engine E. A shaft 62 is journaled in a bearing 64 preferably concentric with above-mentioned shoulder 56 and has suitably mounted above-mentioned gear 24. As hereinbefore stated gear 24 meshes with timing gear 26 of engine E thereby receiving continuous motion whenever engine E is running. A suitable oil seal 66 is interposed preferably between bearing 64 and gear 24 to prevent any appreciable leakage of fluid along shaft 62. However, if such leakage does take place, provided the quantity is not excessive so as to deplete the supply in torque tube T, no harm will be done, since the fluid constitutes perfectly satisfactory lubricant for engine E. Shaft 62 has an enlarged portion 65 provided with opposed flat surfaces 65ª—65ª on which enlarged portion is non-rotatably carried a pumping gear 68. Shaft 62 is also provided with a bearing sleeve or inner race 70 supported in a bearing 72 carried in a head or cover portion 74. Head 74 is clamped by suitable bolts or the like in fluid tight relation with pump 54 and encloses gear 68 and a companion pumping gear 76 meshed therewith and carried on a bearing 78 in turn carried on a pintle 80 supported in body 54 and head 74. Head 74 has a passageway 82, Fig. 2, connected as by a fitting 84 with above-mentioned suction pipe 20 and leading to an inlet port 86 communicating with the tooth spaces between gears 68 and 76 whereby fluid F is supplied to the tooth spaces in a manner well-known in gear pumps. Similarly a port 88 communicates with the tooth spaces on the discharge side of gears 68 and 76 and also with a passageway 90 in head 74, communicating through a fitting 92 with above-mentioned pressure pipe 28. Flat portions 65a serve to drive gear 68 by pressure against it at diametrically opposed points so that the force is symmetrically distributed within the gear and has no tendency to distort or displace it in an unsymmetrical manner. Furthermore, the unflattened part of portion 65 offers a generous area for support of gear 68 against the very considerable side thrust resulting from the fluid pressure.

Figure 4:
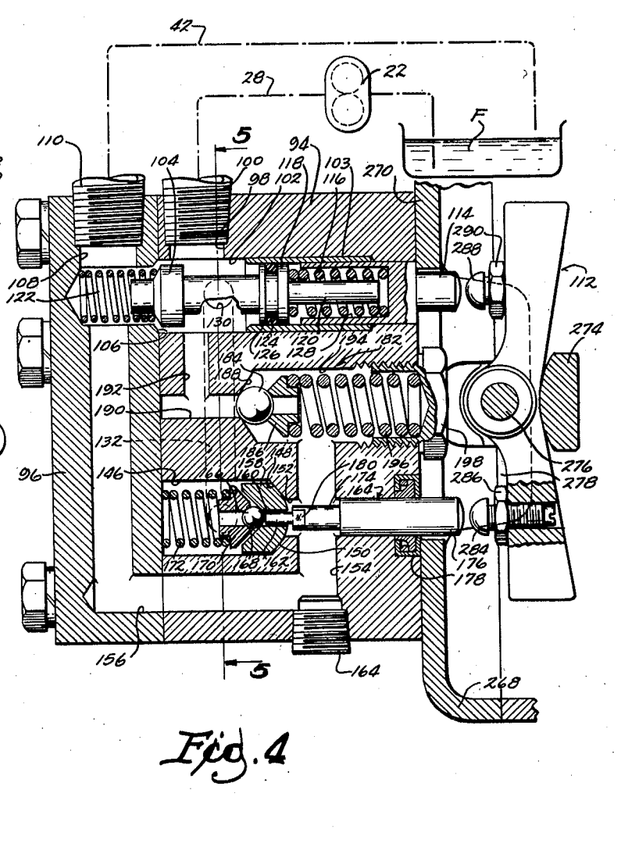
Fig. 4 is an enlarged horizontal sectional view of a fluid control unit indicated in Fig. 1, partially diagrammatic in character.

Fluid control unit 30 is actuated by a cam arrangement to be described, partially from rocking of rockshaft 36. In the present instance cylinder 34 is of the single acting type which dictates, to a certain extent, the construction of unit 30. As seen in Fig. 4, the unit comprises a block 94 having a cap or closure 96. Block 94 has a bore 98 receiving a fitting 100 communicating with above-mentioned pressure pipe 28, the fluid flowing in pipe 28 passing through bore 98 into a bore 102 and to the left as seen in Fig. 4 past a valve head 104 spaced from a seat 106, the fluid entering a bore 108 communicating with a fitting 110 connected with return pipe 42. This condition obtains most of the time, the fluid from the pump 22 bypassing as just described past valve head 104. When it is desired to actuate the power lift, however, a cam 112 is tilted in a manner to be described and presses on a tappet portion 114 slidable in above-mentioned bore 102, a sleeve 103 being interposed to provide a suitable surface, to take up wear, etc. Tappet 114, in the present instance by means of a relatively stiff spring 116, presses against a collar 118 on a stem 120 connected with above-mentioned valve 104. Valve 104 is urged away from above-mentioned seat 106 by means of a relatively flexible spring 122 which is readily overcome by spring 116. Valve 104 is accordingly pressed against seat 106 and the flow of fluid past valve head 104 to pipe 42 is interrupted. Pressure immediately builds up in bore 102 and is transmitted to ram cylinder 34 as will be described presently.

Collar 118 retains a packing ring 124 and which is further retained by a collar 126, also on stem 120, the area of bore 102 in the region of packing ring 124 being substantially the same as the area of valve head 104 exposed to the pressure developed in bore 102, so that the force tending to hold valve 104 against seat 106 will be substantially the same as the force against packing ring 124 and collar 126 tending to force stem 120 in the opposite direction. Valve 104 will, therefore, be balanced by the pressure against packing 124 and may be readily seated or unseated at any time by means of tappet 114 or spring 122 in spite of any pressure which may exist in bore 102. The purpose of spring 116 is to relieve seat 106 from excessive pressure directly from cam 112, the parts being adjusted so that stem 120 will not be contacted by the bottom of bore 128 in tappet 114 and which bore receives above-mentioned spring 116, when valve 104 contacts seat 106. In this way the pressure against seat 106 is always yielding to the extent of the flexibility of spring 116. In the event of sticking of packing 124 or failure of valve 104 to move under the influence of spring 116, for any other reason, spring 116 may compress so that stem 120 is actuated directly by tappet 114 by contact of stem 120 with the bottom of bore 128. In this way any such sticking will be overcome and spring 116 can cause further movement of valve 104 to seated position.

Figure 5:
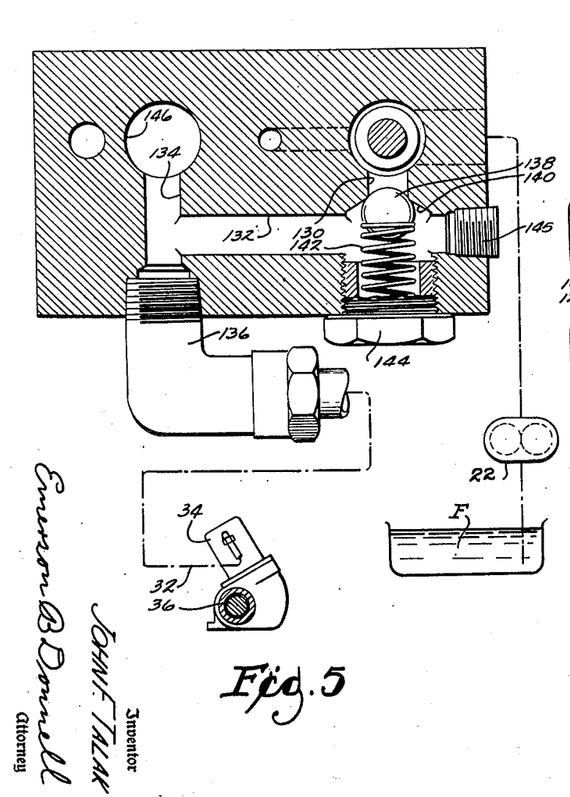
Fig. 5 is a vertical sectional view of the same on the line 5—5 of Fig. 4, also partially diagrammatic in character.

The pressure developed in bore 102 is transmitted through a port 130 to a bore 132 extending beneath bore 102 downwardly as seen in Fig. 4 and communicating with a bore 134 which communicates through a fitting 136, Fig. 5, with above-mentioned pipe 32 leading to ram cylinder 34. As will now be apparent the pressure developed in bore 102 upon closing of valve 104 will be communicated through port 130, bore 132, bore 134 and fitting 136 to pipe 32 and thus to cylinder 34. In order to relieve pump 22 from the necessity of continuously maintaining such pressure, a check valve in the form of a ball 138 is yieldably maintained on a seat 140 by spring 142 reacting against a plug 144, bore 130 being enlarged beyond seat 140 to provide room for these parts and to form seat 140. Bore 130 is closed adjacent valve 138 by means of a plug 145.

Bore 134 communicates with a bore 146 which has a seat 148 against which is seated a valve element generally designated as 150. Beyond seat 148, or to the right as seen in Fig. 4, a bore 152 communicates with a bore 154 which in turn connects with a drain or discharge bore 156 extending to the left as seen in Fig. 4 and communicating with above-mentioned bores 108 and 102. Bore 108 as above described connects with return pipe 42.

It will now be apparent that ram cylinder 34 may be actuated by pressure in bores 102, 130, 132 and 134 and that the pressure will be retained by valve 138 and valve 150 so that after cylinder 34 has been actuated valve 104 may be released, or opened, whereby the pressure in bore 102 may be released to return pipe 42 so that the fluid may circulate freely without substantial pressure, while pressure is retained in cylinder 34. As will also be apparent, when it is desired to relieve cylinder 34 of pressure, valve 150 may be opened as will appear, and the pressure discharged to bores 152, 154, 156 and above-mentioned bore 108, pipe 42 and torque tube T.

Valve 150 is subject to the full pressure developed in cylinder 34 which may at times be quite high, due to shock loads on the attached implements, or for other reasons, and accordingly might resist opening when it is desired to relieve such pressure. In order to minimize this effect, valve 150 comprises an element 158 received in bore 146 with substantial clearance for passage of fluid thereabout and pressed against above-mentioned seat 148. Element 158 has a bore 160 within which is received, also with clearance, a finger 162 comprising part of a tappet generally designated as 164. A peak pressure relief valve in the form of a ball 166 is received in a seat portion 168 disposed about bore 160 and pressed thereagainst by a fitting 170 which is in turn pressed by a spring 172 reacting against a portion of above-mentioned closure 96. Tappet 164 has an enlarged portion 174 which contacts the underside of element 158 in certain positions of the parts and a further enlarged portion 176 which extends exteriorly of block 94 into position to be actuated by a portion of cam 112, an oil seal 178 being disposed about portion 176 to prevent any material leakage of fluid outside of block 94.

As will now be apparent fluid is prevented from returning from cylinder 34 through bore 152 by reason of the seating of element 158 on seat 148, and from returning through bore 160 by seating of valve 166 on seat 168. Whereas shifting of element 158 under peak pressure conditions in cylinder 34 and bore 146 might require very substantial force, by reason of the comparatively large area of element 158 subject to such pressure, unseating of ball 166, because of the relatively limited area exposed to pressure will be comparatively easy. Accordingly tappet 164 is so constituted that, upon actuation of cam 112, finger 162 will contact and unseat ball 166 before portion 174 contacts element 158. In other words, finger 162 is for example longer than the space between the right hand portion, as seen in Fig. 4, of ball 166, and the right hand portion of element 158. Fluid may then flow past ball 166 and past finger 162, one or more flat or other suitable cutaway portions 180 being provided on portion 174 to prevent blocking of bore 160 thereby. The peak pressure in bore 146 having thus been relieved, further movement of tappet 164 causes portion 174 to contact element 158 which due to the reduced pressure is now relatively easily shifted away from seat 148 thus providing for a comparatively large volume of flow through both bore 160 and the clearance about element 158 for rapid discharge of fluid from cylinder 34. When such discharge is completed the parts are restored to the closed position by spring 172.

In any fluid pressure system, excessive pressure may possibly be developed through some inadvertency or unforeseen condition and for this reason a relief valve generally designated as 182 is provided. It comprises a ball 184 pressed by a fitting 186 against a seat 188 provided in a bore 190. Bore 190 communicates, through a bore 192 with above-mentioned bore 102 which, as above described communicates with pressure pipe 28. If for any reason, the pressure in pipe 28 and bore 102 rises above a predetermined normal or safe amount, this pressure, which is communicated to bore 190 will shift ball 184 away from seat 188 and fluid will escape into an enlarged bore 194. Bore 194 houses a spring 196 which presses above-mentioned fitting 186 against ball 184, spring 196 reacting against a plug-like cap 198 received in block 94. Above-mentioned bore 154, as well as communicating with bores 156 and 152, opens into bore 194 so that fluid escaping past ball 184 passes readily into above-mentioned bore 108 and returns through pipe 42 to torque tube T. It will now be apparent that pressure on tappet 114 will cause actuation of cylinder 34 which in the present instance causes raising of attached implements as will appear, while pressure on tappet 176 will release fluid from cylinder 34 with consequent lowering of such implements.

Figure 6:
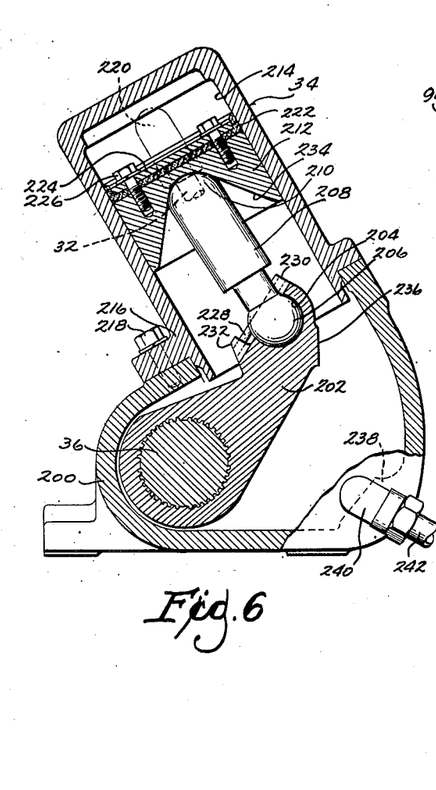
Fig. 6 is an enlarged vertical axial sectional view of a fluid cylinder indicated in Fig. 1.

Turning now to the construction of cylinder 34, as seen in Fig. 6, above-mentioned rockshaft 36 is journaled in a rockshaft housing generally designated as 200 and has splined or otherwise suitably fixed thereon an actuating arm or crank 202. Arm 202 has seated in a suitable socket 204 spaced from shaft 36, a ball shaped connection 206 of a connecting rod generally designated as 208. Connecting rod 208 has a part-spherical end portion 210 which is seated on the underside of a piston 212 reciprocable in a bore 214 of above-mentioned cylinder 34. Cylinder 34 is seated on and suitably fastened to above-mentioned housing 200 as by means of a flange 216 and cap screws or the like 218. Shaft 36 is normally biased by the weight of the parts toward counterclockwise rotation as seen in Fig. 6 so that piston 212 will normally be urged toward the upper end of cylinder 34. Pressure fluid introduced into cylinder 34 above piston 212 through a fitting 220 from above-mentioned pipe 32 will accordingly force piston 212 downwardly and rotate shaft 36 in a clockwise direction in opposition to the bias aforesaid. Piston 212 has a suitable packing such for example as a cup leather 222 maintained in place on piston 212 by a washer 224 held by cap screws as 226. Ball portion 206 is freely but non-removably held in socket 204 in any suitable manner, in the present instance short sections of rod or shaft 228 being spaced on either side of the ball and held by bosses 230 and 232, the shaft sections being spaced closely enough to prevent escape of ball 206 from socket 204. Part-spherical portion 210 is free to move away from the underside of piston 212, under certain conditions said piston being maintained at or near the top of cylinder 34 as by atmospheric pressure, while shaft 36 rocks in a clockwise direction, for example by reason of the action of attached implements. Under these conditions part-spherical portion 210 may move entirely away from the underside of piston 212 so that shaft 36 is free to rock under the influence of the attached implements. The underside of piston 212 has a funnel shaped surface 234 so that, when portion 210 returns, or in the event that piston 212 descends in order to raise attached implements by rocking shaft 36, portion 210 will be guided into the middle of surface 234 or into correct relation to be actuated by piston 212. A positive stop pad 236 is provided on arm 202 and which contacts a stop pad 238 within housing 200 upon extreme downward travel of piston 212. A fitting 240 communicates with the interior of housing 200 and connects with a pipe 242 which provides for displacement of air within housing 200 as piston 212 descends.

Pipe 242 connects with a fitting 244, Figs. 1 and 1a, which in the present instance connects with a hollow stud 246 engaged with a casing or housing 248 constituting a part of steering gear S. Stud 246 secures a flange 250 of a steering column 252 with above-mentioned casing 248, the latter communicating with the interior of torque tube T as hereinbefore described. Fitting 244 connects with a breather cap of well-known form 254 and which comprises a cap 256 containing a quantity of fibrous or like material 258 surrounding the end of a short section of pipe 260. Pipe 260 communicates with fitting 244 and furnishes a means of exit and entrance of air for pipe 242 and stud 246, and accordingly for casing 248 and torque tube T. Other means of access for pipe 242 and breather 254 to torque tube T are contemplated as within the scope of the invention.

It will be apparent that when piston 212 is forced downwardly, a definite quantity of air will be displaced out of housing 200 to pipe 242. However an equivalent volume of fluid will be introduced into cylinder 34 above piston 212. This same quantity of fluid will be removed at the same time from torque tube T so that the major portion of the air will bypass breather 254 and pass on into torque tube T to replace the volume lost by transfer of the fluid to cylinder 34. When piston 212 is raised (as the implements are lowered) fluid will be returned to torque tube T and air will pass back through fitting 244 and pipe 242 into housing 200. Thus the flow through breather 254 will normally be very slight and in fact limited to the expansion or contraction of the air in torque tube T and housing 200.

Packings such as 222 are ordinarily highly efficient but, in the event of leakage of fluid into housing 200, as for example after long use of the apparatus, such fluid will not be lost but will be returned through pipe 242 to torque tube T.

Housing 200 is secured to the tractor in any suitable manner, preferably above axle housing A. As hereinbefore stated, control unit 30 is actuated at least in part by rocking of rockshaft 36. It is also actuated in part by a hand lever generally designated as 262 best seen in Figs. 7, 8 and 11. Lever 262 comprises a strip of flexible metal or the like 264 which extends generally in a vertical direction, in the present instance at the right end of shaft 36. Strip 264 is suitably fixed in relation to a collar 266 which is loose on shaft 36 and which extends through the cover or closure 268 of a cam housing 270. Housing 270 is permanently fixed to rockshaft housing 200 and surrounds the end of shaft 36. Collar 266 is fixed to a cam actuating element 272, also loose on shaft 36 so that collar 266 and cam actuating element 272 may rock about shaft 36 or when desired may be fixed in relation to shaft 36 as will appear. Cam actuating element 272, in the present instance below shaft 36, has a finger portion 274 which extends into contact with or substantially into contact with above-mentioned cam 112. As best seen in Fig. 4, cam 112 comprises a member in the shape of a shallow open V swingable on a substantially vertical pivot pin 276 supported in a portion 278 suitably fixed in cam housing 270. Finger portion 274 presses toward the left as seen in Figs. 4, 7, 9 and 10 and, when the power lift parts are at rest, it is centrally disposed in the center of the V formed by cam 112. As will be apparent, forward shifting of finger 274 will cause rocking of cam 112 in a counterclockwise direction as seen in Fig. 4, or into the position indicated in Fig. 9. Also it will be apparent that a very slight movement of finger 274 will cause a substantial rocking movement of cam 112. Such movement will bring one of the surfaces 280, 282, substantially into parallelism with the path of travel of finger portion 274. Therefore further movement of finger 274 will have no further appreciable effect on cam 112. As seen in Fig. 10, slight rearward movement of finger 274 by reason of engagement with a cam surface 282 will rock cam 112 in the opposite direction while further movement will have no further appreciable effect on cam 112. Cam 112 has an adjustable abutment 284 suitably threaded into itself for adjustment toward and from above-mentioned tappet 176, a lock nut 286 being provided to hold the adjustment. A similar abutment 288 and lock nut 290 is provided for contact with tappet 114. Rocking movement of cam 112 will, therefore, press either on tappet 114 for transmitting fluid pressure to cylinder 34 or on tappet 176 for releasing fluid pressure therefrom. At other times finger 274 will remain in the Fig. 4 position wherein neither of tappets 114 or 176 is pressed, the status of ram cylinder 34 being then maintained without change. Abutments 284 and 288 are readily adjusted to provide slight clearance from their respective tappets so that the latter are free to take their normal position at such times as power lifting is not desired.

Figures 7, 8, 11:
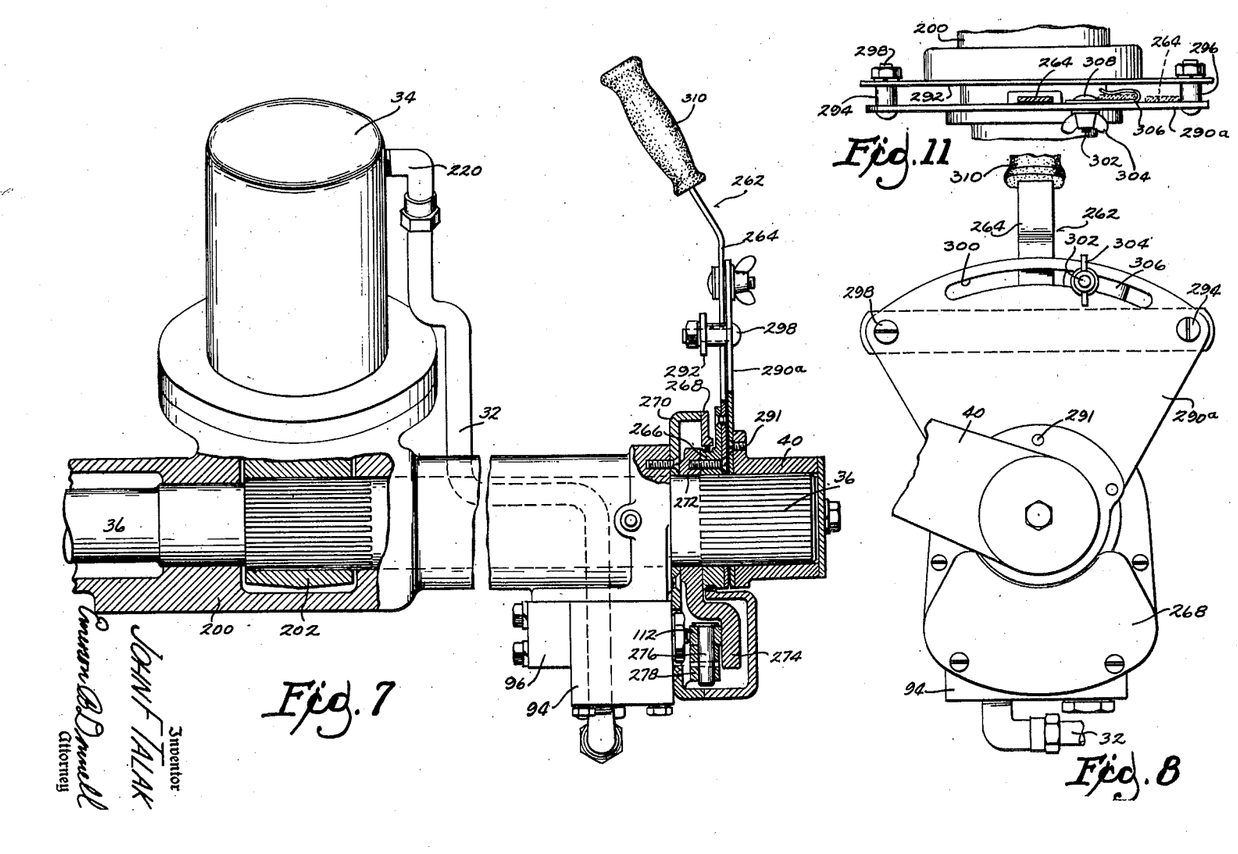
Fig. 7 is an enlarged rear elevation of a rockshaft assembly indicated in Fig. 1, with parts broken away.
Fig. 8 is a right end elevation of the same with parts removed and others broken away.
Fig. 11 is a plan view with parts broken away, of the mechanism shown in Fig. 8.
Figure 9:
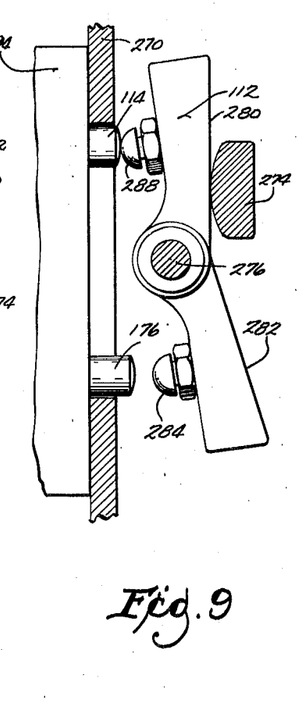
Fig. 9 is a view of a portion of Fig. 4 showing the parts in different position.
Figure 10:
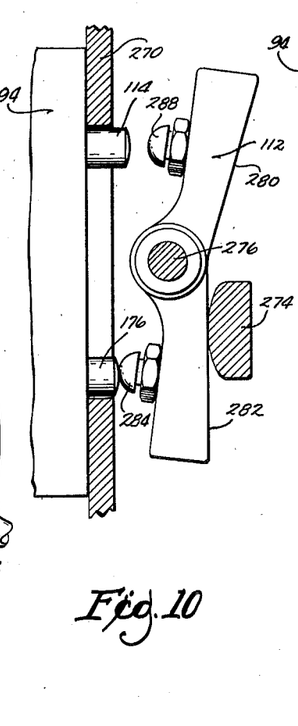
Fig. 10 is a similar view showing the parts in still another position.

It will now be apparent that rocking of lever 262 for example in a counterclockwise direction as seen in Fig. 8 will rock cam 112 to the position shown in Fig. 9 pressing tappet 114 and, through action on piston 112, causing clockwise rotation of rockshaft 36. In other words, rockshaft 36 will rock in the opposite direction to the movement of lever 262 out of inactive position. As will be apparent, clockwise rocking of lever 262 will cause counterclockwise rotation of shaft 36, while bringing lever 262 to a substantially vertical position, or a position such that finger portion 274 takes the position shown in Fig. 4 will stop the rocking movement of shaft 36 and cause it to be held in whatever position it has attained.

In order to shift cam 112 in response to rocking of shaft 36, a quadrant or sector 290a, Figs. 7, 8 and 11, is fixed in relation to above-mentioned arm 40 on shaft 36, in the present instance being fastened to a portion of arm 40 as by screws 291, so as to rock therewith, lever 262 extending close to sector 290a and being guided by a strip 292 spaced from quadrant 290a by means of spacers or abutments 294 and 296, the assemblage being held together by bolts as 298. Spacers 294 and 296 act as limit stops for lever 262. Thus if lever 262 is shifted backwardly or to the left as seen in Fig. 11 into contact with spacer 294, as hereinbefore explained shaft 36 will rock in such a direction as to shift quadrant 290a, or more properly abutment 294 to the right thus tending to restore lever 262 to a vertical position. As soon as this position is reached, as above explained, finger 274 will reach the position of Fig. 4 whereupon the rocking of shaft 36 will be stopped and the parts held in the new position. This would result in raising arms 38 and 40 and accordingly any implements connected therewith.

In similar manner, shifting of lever 262 to the right into contact with abutment 296 would result in leftward movement of the latter which would continue until lever 262 again reached a substantially vertical position at which time the condition of Fig. 4 would obtain and the movement would be stopped. In practice, it is seldom desirable to shift lever 262 into contact with abutment 296, the apparatus being adaptable for lowering an implement to a predetermined depth and maintaining it there. For this purpose quadrant 290a is provided with a slot 300 in which is adjustably carried a bolt 302 preferably provided with a thumb nut 304. Bolt 302 engages spring clip 306 proportioned to receive lever 262 by slight opening movement, the lever when forced within clip 306 resting, for example on or against a head 308 of bolt 302. Lever 262 is thereby quite firmly maintained in fixed relation to quadrant 290a although readily dislodged by the action of the tractor driver on a handle 310 carried on strip 262. Thumb nut 304 is readily loosened and clip 306 shifted to a position corresponding to the desired depth of action of whatever implement is supported on arms 38 and 40. When it is desired to lower the implement, lever 262 is lodged in spring clip 306 whereupon quadrant 290a and all the attached parts are rocked in a direction to lower the implement. Again as soon as lever 262 becomes vertical the movement stops. A distinct advantage of the arrangement will now be apparent.

Spring clip 306 acts as a detent and ties lever 262 in fixed relation to quadrant 290a and accordingly to rockshaft 36. Assuming the parts to be in the desired working position, finger 274 will be in the position of Fig. 4. Now if any leakage from cylinder 34 or valve 138 allows the implement to settle to a greater depth, such change will disturb rockshaft 36 which movement, because of the tie-up between quadrant 290a and lever 262, will shift finger 274 in the direction necessary to cause cylinder 34 to tend to restore the parts to the set position. Thus finger 274 will take the position of Fig. 9, forcing fluid into cylinder 34 and rasing the implement. The manipulation is very simple, the implement being raised merely by placing lever 262 against abutment 294 and immediately restored to the predetermined depth by lodging lever 262 in spring clip 306. If for any reason, it is desirable to shift the parts further in the implement lowering direction, lever 262 may be readily shifted past spring clip 306 by swinging it toward the operator, in in an upward direction as seen in Fig. 11.

A typical implement which would require control such as just outlined would be found in a so-called tool bar machine such for example as a field tiller generally designated as 312, Fig. 1, which has a cross pipe or beam 314 carried on pintles as 316 carried in latch mechanism 318 secured to draft members as 320 pivoted at 322 to a portion of axle housing A. Bar 314 has a mast 324 which extends upwardly and forwardly and is maintained in position by means of a compression link generally designated as 326 pivoted to axle housing A at 328. Draft arm 320 has a counterpart 330 substantially parallel thereto, the members being spaced laterally of the tractor on opposite sides of the center line thereof so as to be positioned substantially vertically below hereinbefore mentioned arms 38 and 40. Arm 40 is connected with draft member 320 by means of a link 332 and similar link 334 connects arm 38 with draft member 330 and is preferably adjustable in length by means of a crank 336. These features forming no part of the present invention are only briefly described. Bar 314 carries preferably a plurality of shanks 338 of any suitable or desired construction fastened thereto by clamps 340 and having shovels 342 which are propelled through the ground as is common in implements of this type. The cultivating depth 344 is attained by manipulation of lever 262 and if by reason of leakage this depth becomes too great it is immediately restored by the action of lever 262 and its mechanism as previously described at length.

Figure 12:
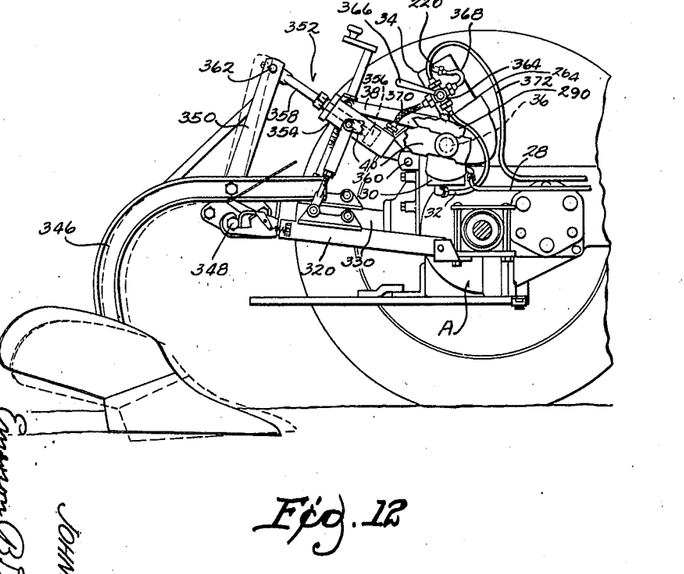
Fig. 12 is a view similar to Fig. 1 of a portion of a tractor showing a modified application of the power lift.

Certain types of implements such for example as plows, have the faculty of determining their own depth of operation. The present invention is highly adaptable to controlling this type of implement as will now be explained. Referring to Fig. 12, a plow generally designated as 346 is shown attached to the same draft members 330 and 320 previously described, by means of pintles as 348, a mast 350 extending upwardly and being spaced from tractor axle housing A by means of a compression link generally designated as 352 comprising a piston and cylinder device in which fluid is trapped as explained hereinafter, and which accordingly maintains a fixed length against compressive force unless the fluid is released. As is well-known, an assemblage of this type swings up and down about a theoretical hitch point removed from the actual hitch point, and changing of the length of link 352 will incline the plow slightly up or down and cause it to run shallower or deeper as the case may be, link 352 remaining under compression at all times.

Assuming now cylinder 34 to be exhausted of fluid as will be described, and therefore ineffective, subject to the downward bias caused by the weight of the parts, plow 346 will be free to seek its own depth according to well-known principles, which depth will be dependent upon the angle of the plow relatively to the ground, the angle at which the pull of the tractor is applied, and the tenacity of the soil or "suck" thereof on the plow. These conditions vary with the surface and texture of the soil and cause the plow to seek various depths from time to time within the range permitted by the swinging of links 320, 330, and 352, and it will be apparent that bodily rising and falling of plow 346 for such or any reason will cause upward or downward swinging of draft elements 320 and 330 with accompanying raising and lowering of arms 38 and 40 and rocking of shaft 36 without change in the length of link 352 it being well known that the depth-seeking force on the plow is very substantial, being, in the case of an upward force, the upward component of the pull of the tractor, and sufficient to easily overcome the weight of the plow and its attached parts including the counter-clockwise bias of shaft 36. This raising and lowering of arms 38 and 40 is utilized for correcting the depth of running of the plow from time to time as necessary by affecting link 352 as will now be described. In the present instance, compression link 352 as hereinbefore suggested is made in the form of a fluid cylinder 354 having a piston 356 and piston rod 358. Cylinder 354 is pivoted to axle housing A at 360 while piston rod 358 is pivoted to mast 350 at 362 and rocking of rockshaft 36 is utilized through control unit 30 to direct fluid into or out of cylinder 354 as necessary to maintain rockshaft 36 in a predetermined position by controlling the angle of plow 346 in relation to the ground. For this purpose above-mentioned pipe 32 connects with a four-way valve 364 of well-known construction having a control handle 366. In one position valve 364 connects pipe 32 with a pipe 368 connected with above-mentioned fitting 220 leading to cylinder 34 while a flexible pipe 370 is connected with an exhaust pipe 372 leading to aforementioned torque tube T. Thus cylinder 354 is inactive while cylinder 34 operates exactly as hereinbefore described.

As to the alternate construction illustrated in Fig. 12, cylinder 352 constitutes a rigid link between pivot 362 and pivot 360 at such times as fluid is trapped between said cylinder and piston 356. Cylinder 352 constitutes a telescoping link which is rigid when containing trapped fluid. In operation, fluid is introduced or exhausted from cylinder 352 through pipe 370 to "steer" the plow up and down as necessary to maintain the plowing depth. When it is desired to raise the plow clear of the ground, lever 262 being placed in a position to raise the implement, fluid is introduced into cylinder 352 extending it and pointing the plow upward. Continued motion of the tractor will then cause the plow to come to a minimum depth or to the surface, cylinder 352 being extended to its limit. Obviously, when piston 356 hits the outer head of cylinder 352, it can go no further and the unit becomes a rigid link both in compression and in tension. Manipulation of four-way valve 364 will then direct the pressure fluid into cylinder 34 through pipe 368, causing upward rocking of arms 38 and 40 and lifting the plow clear of the ground. Cylinder 352 for the time being acts as a tension member with piston 356 against the outer cylinder head. The fact that four-way valve 364 exhausts cylinder 352 under these conditions does no harm, because at the time the unit is acting as a tension link and there is no inward tendency exerted on piston 356.

When it is necessary to lower the plow, the valve 364 may be returned to its position rendering cylinder 352 active. This will exhaust cylinder 34 allowing the plow to drop, the fluid trapped in cylinder 352, however, preventing the plow from tilting to a ground entering position. Lever 262 is now placed in spring clip 306, defining the desired depth of plowing, whereupon, the valve mechanism as described will allow cylinder 352 to exhaust under the compression of the ground pressure or friction on the plow bottom. The plow will then tilt in the opposite direction to that indicated in Fig. 12 and immediately start to go down, owing to the natural and well-known downward pull or "suck" of the ground. This movement will rock shaft 36 and at a predetermined point will bring finger 274 to the neutral position shown in Fig. 4 and, in effect, lock piston 356 in whatever position it has then reached. From this point on, deviation of the plow from the established depth will rock the shaft 36 and either add fluid to or exhaust it from cylinder 352 to steer the plow in the ground to run shallower or deeper until the desired depth is restored.

When plowing, however, it is not desirable to force the plow to a lesser depth by operation of piston 212, as described in connection with implement 312, and for this reason handle 366 is shifted so that pipe 32 is connected with pipe 370 while pipe 368 is connected with exhaust pipe 372. This disables cylinder 34 so that it will not interfere with rocking of rockshaft 36. Control unit 30 then operates as before except that cylinder 354 now responds to rocking of shaft 36 while cylinder 34 is inactive. Sufficient to say if plow 346 tends to run too deep, rockshaft 36 is rocked counterclockwise as seen in Fig. 12 which in accordance with the foregoing explanation will send pressure fluid into pipe 32. This, through valve 364 and flexible pipe 370 will extend piston rod 358 and angle plow 346 for example into the dotted position. This will cause the plow to tend to rise in the soil until rockshaft 36 is rocked sufficiently in a clockwise direction to stop the flow of fluid through pipe 32 into cylinder 354 as hereinbefore explained. As will be apparent, if plow 346 runs too shallow, the reverse action will take place and piston rod 358 will be allowed to retract into cylinder 354 under the pressure of the ground reaction on plow 346, whereupon the latter will be angled in the opposite direction and will tend to run deeper. In practice the parts will find a neutral point in accordance with the setting of lever 262 and any diversion from this level will be automatically corrected.

If it is desired to control by means of the above described mechanism an implement or implements of any suitable or well-known form mounted other than at the rear of the tractor, an arm 374, Fig. 1, is fastened to arm 40 as by means of bolts 376, and connected to the implement by any suitable means such as a pull-rod 377. A similar arm may be applied to arm 38 in a similar manner and for a similar purpose.

The operation of the several embodiments is clear from the above description, it being sufficient to say, that the arms 38 and 40 are readily rocked for raising or lowering implements or objects connected therewith by shifting lever 262, the movement stopping when quadrant 290ª has restored lever 262 to its neutral position. By fixing lever 262 to quadrant 290ª, the mechanism will operate to achieve any predetermined depth of operation or setting of the parts, and in case of settling thereof from such setting by reason of leakage while the tractor engine is running will act to restore such setting. Furthermore, the principle can be utilized other than by means of arms 38 and 40, the latter being used to respond to variations in implement position and initiate corrective action while the corrective effect is exerted through other means such as cylinder 354, in which case either downward or upward deviation of the implement is corrected as heretofore explained.

The above being a complete description of illustrative embodiments of the invention, what is claimed as new and desired to be secured by Letters Patent of the United States is:

1. In a power lift for a tractor having an engine, a fluid reservoir and a fluid pump receiving fluid from the reservoir and driven from the engine, the combination of a rockshaft journaled on the tractor, an arm on the rockshaft, a fluid cylinder fixed on the tractor, a piston in the cylinder and connected to rock the arm in response to fluid pressure in the cylinder, a sector fixed at one end of the rockshaft and rockable therewith, a cam actuating element journaled on the rockshaft adjacent the sector, a lever fixed to the cam actuating element and rockable therewith independently of said rockshaft and relatively to said sector, means for fixing said lever in relation to said sector to cause oscillation of said cam actuating element in unison with said rockshaft, a housing enclosing said cam actuating element, a cam journaled in said housing, a finger on said cam actuating element, complementary surfaces on said cam and finger such that rocking of said finger in one direction will rock said cam in one direction while rocking of said finger in the other direction will cause rocking of said cam in the other direction, spaced abutments on said cam, a fluid control unit associated with said housing and including a valve actuating tappet projecting into said housing and aligned with each of said abutments, a pressure fluid pipe leading from said pump to said fluid control unit, a return pipe leading from said unit to said fluid reservoir, a pipe leading from said unit to said fluid cylinder, a valve in said unit normally affording communication between said pressure fluid pipe and said return pipe, said valve being operable by pressure on one of said tappets to close said communication for building pressure in said pressure fluid pipe, said pressure fluid pipe communicating with said pipe leading to said fluid cylinder, a non-return valve interposed between the last mentioned pipes, a normally closed valve arranged to provide communication from said pipe leading to said fluid cylinder and said return pipe and responsive to pressure on the other tappet for opening such communication, said finger having a neutral position in which said cam is ineffective to press either of said tappets, and an overpressure relief valve affording communication between said pressure fluid pipe and said return pipe but effective to prevent such communication except in the event of excessive pressure in said pressure fluid pipe.

2. In a power lift for a tractor having an engine, a fluid reservoir and a fluid pump receiving fluid from the reservoir and driven from the engine, the combination of a rockshaft journaled on the tractor, an arm on the rockshaft, a fluid cylinder fixed on the tractor, a piston in the cylinder and connected to rock the arm in response to fluid pressure in the cylinder, a sector fixed at one end of the rockshaft and rockable therewith, a cam actuating element journaled on the rockshaft adjacent the sector, a lever fixed to the cam actuating element and rockable therewith independently of said rockshaft and relatively to said sector, means for fixing said cam actuating element in relation to said rockshaft to cause rocking of said element in unison with said rockshaft, a cam journaled for rocking movement, a finger on said cam actuating element, complementary surfaces on said cam and finger such that rocking of said finger in one direction will rock said cam in one direction while rocking of said finger in the other direction will cause rocking of said cam in the other direction, spaced abutments on said cam, a fluid control unit associated with said housing and including a valve actuating tappet projecting into the path of travel of each of said abutments, a pressure fluid pipe leading from said pump to said fluid control unit, a return pipe leading from said unit to said fluid reservoir, a pipe leading from said unit to said fluid cylinder, a valve in said unit normally affording communication between said pressure fluid pipe and said return pipe, said valve being operable by pressure on one of said tappets to close said communication for building pressure in said pressure fluid pipe, said pressure fluid pipe communicating with said pipe leading to said fluid cylinder, a non-return valve interposed between the last mentioned pipes, a normally closed valve arranged to provide communication from said pipe leading to said fluid cylinder and said return pipe and responsive to pressure on the other tappet for opening such communication, said finger having a neutral position in which said cam is ineffective to press either of said tappets.

3. In a power lift for a tractor having an engine, a fluid reservoir and a fluid pump receiving fluid from the reservoir and driven from the engine, the combination of a rockshaft journaled on the tractor, an arm on the rockshaft, a fluid cylinder fixed on the tractor, a piston in the cylinder and connected to rock the arm in response to fluid pressure in the cylinder, a sector fixed at one end of the rockshaft and rockable therewith, a cam actuating element journaled on the rockshaft adjacent the sector, a lever fixed to the cam actuating element and rockable therewith independently of said rockshaft and relatively to said sector, means for fixing said lever in relation to said sector to cause oscillation of said cam actuating element in unison with said rockshaft, a cam supported for valve actuating movement, a portion on said cam actuating element, complementary surfaces on said cam and portion such that rocking of said element in one direction will rock said cam in one direction while rocking of said element in the other direction will cause rocking of said cam in the other direction, spaced abutments on said cam, a fluid control unit associated with said housing and including a valve actuating tappet projecting into the path of travel of each of said abutments, a pressure fluid pipe leading from said pump to said fluid control unit, a return pipe leading from said unit to said fluid reservoir, a pipe leading from said unit to said cylinder, a valve in said unit normally affording communication between said pressure fluid pipe and said return pipe, said valve being operable by pressure on one of said tappets to close said communication for building pressure in said pressure fluid pipe, said pressure fluid pipe communicating with said pipe leading to said fluid cylinder, a non-return valve interposed between the last mentioned pipes, and a normally closed valve arranged to provide communication from said pipe leading to said fluid cylinder and said return pipe and responsive to pressure on the other tappet for opening such communication, said portion having a neutral position in which said cam is ineffective to press either of said tappets.

4. In a tractor power lift the combination of a rockshaft, a fluid motor connected for rocking said rockshaft, a pump, a fluid reservoir arranged to supply fluid to said pump, valve means connected with said pump and said fluid motor and arranged to control fluid from said pump to cause rocking of said rockshaft, said valve means having a neutral position for locking said fluid motor against movement, cam means journaled on said rockshaft and connected to said valve means so as to actuate said valve means upon rotation of said cam means, said valve means being so connected to said fluid motor as to cause rotation of said rockshaft in the opposite direction from the rotation of said cam causing said actuation of said valve means, said cam means having a neutral position corresponding to said neutral position of said valve means, and means for rotating said cam means relatively to said rockshaft and for fixing said cam means to said rockshaft in desired positions whereby such rotation of said cam means out of said neutral position will cause opposite rotation of said rockshaft, and whereby said rockshaft will cause return rotation of said cam toward said neutral position and cessation of said rotation when said cam reaches said neutral position.

(References on following page)

References Cited in the file of this patent

UNITED STATES PATENTS

| | | | |
|---|---|---|---|
| Re. 22,019 | Brown | Feb. 10, 1942 |
| 858,207 | Patten | June 25, 1907 |
| 1,924,466 | Smith | Aug. 29, 1933 |
| 1,929,804 | Brown | Oct. 10, 1933 |
| 2,286,256 | Brown | June 16, 1942 |
| 2,311,516 | Brown et al. | Feb. 16, 1943 |
| 2,363,292 | Brown | Nov. 21, 1944 |
| 2,363,977 | Kucher | Nov. 28, 1944 |
| 2,399,756 | Mott | May 7, 1946 |
| 2,405,980 | Sands et al. | Aug. 20, 1946 |
| 2,437,875 | Chambers et al. | Mar. 16, 1948 |
| 2,455,727 | Bunting | Dec. 7, 1948 |
| 2,533,833 | Mott | Dec. 12, 1950 |
| 2,540,429 | Cordes | Feb. 6, 1951 |
| 2,547,552 | Anderson | Apr. 3, 1951 |
| 2,631,515 | McRae | Mar. 17, 1953 |
| 2,679,199 | Strehlow | May 25, 1954 |